United States Patent [19]

Chung

[11] Patent Number: 4,697,220

[45] Date of Patent: Sep. 29, 1987

[54] PROTECTIVE DEVICE FOR AUTO ILLUMINATION SYSTEM

[75] Inventor: Szu-Chi Chung, Taipei, Taiwan

[73] Assignee: Equus Inc., Taipei, Taiwan

[21] Appl. No.: 840,678

[22] Filed: Mar. 18, 1986

[51] Int. Cl.$^4$ .................. H02H 3/093; H05B 41/26
[52] U.S. Cl. .................................. 361/100; 361/98; 315/82; 315/307
[58] Field of Search ............... 361/93, 113, 98, 100; 315/82, 83, 307, 308, 310, DIG. 7; 323/901

[56] References Cited

U.S. PATENT DOCUMENTS

| | | | |
|---|---|---|---|
| 4,291,254 | 9/1981 | Arlt et al. | 315/307 X |
| 4,395,680 | 7/1983 | Slutzky | 324/392 |
| 4,455,509 | 6/1984 | Crum | 361/93 X |
| 4,481,553 | 11/1984 | Owen | 361/93 |
| 4,511,195 | 4/1985 | Barter | 315/308 |

Primary Examiner—A. D. Pellinen
Assistant Examiner—H. L. Williams
Attorney, Agent, or Firm—Browdy and Neimark

[57] ABSTRACT

A protective device or an auto illumination system, including an illumination component, a protective diode, a pulse processor, an overcurrent limit circuit, a high-voltage oscillator circuit and a trigger control circuit. An overcurrent limit circuit is added to the auto illumination system for protecting illumination elements from being burned due to excess current, by providing a curbing signal therefrom, so that the illumination elements can be protected from being destroyed even when the engine speed runs at over 18000 rpm, or as a result of mistakenly connecting an input signal line to the rotary distributor, increasing the durability of the illumination system. A trigger control circuit is provided for receiving a triggering signal to generate a high negative voltage for the illumination elements.

2 Claims, 1 Drawing Figure

PROTECTIVE DEVICE FOR AUTO ILLUMINATION SYSTEM

BACKGROUND OF THE INVENTION

The present disclosure relates to a protective device for an auto illumination system.

Generally an auto illumination system is operated by a current which is proportional to the engine speed; therefore, the illumination elements are easily subjected to excess current and to overheat which can often destroy the illumination. Another kind of illumination system adopting high-power circuit elements is designed to prevent such destruction from overheat, but the relative cost is accordingly raised.

SUMMARY OF THE INVENTION

In view of all the drawbacks with the conventional auto illumination system, the present invention is directed to providing a protective device for said illumination system, which is practical and low-cost, to increase effectively the durability of illumination elements. The present invention is particularly directed to a device mainly comprising an overcurrent limit circuit, a high voltage oscillator circuit and a trigger control circuit, wherein the overcurrent limit circuit functions to protect the illumination element from being damaged due to excess current by providing a timely curbing signal when a large current exists or when the signal input line is wrongly connected to a rotary distributor. The trigger control circuit receives a triggering signal provided from the overcurrent limit circuit to generate a negative high voltage which makes the illumination element work.

The primary object of the present disclosure is to provide an effective protective device for an auto illumination system to prevent the destruction of illumination elements from the destruction due to excess current, by adopting an overcurrent limit circuit which produces a curbing signal to limit to a safe level an excess current, owing for instance to the high speed of the engine. According to the present invention, by way of a protective diode, a protective device can be freed from having its circuit components damaged by an inverse voltage, so that a normal working condition for the device can be maintained.

A further object of the present disclosure is to provide a protective device for the auto illumination system, wherein the protective device maintains the working voltage of said illumination elements in a steady condition, by adopting a high-voltage oscillator circuit which provides the illumination element with a necessary high voltage.

A further object of the present disclosure is to provide a protective device for the auto illumination system wherein a trigger control circuit, capable of receiving a triggering signal, can output a negative high voltage to make said illumination elements function.

For better expounding the operational modes of the present invention, a circuit diagram is shown.

DESCRIPTION OF PREFERRED EMBODIMENT

Figure 1:
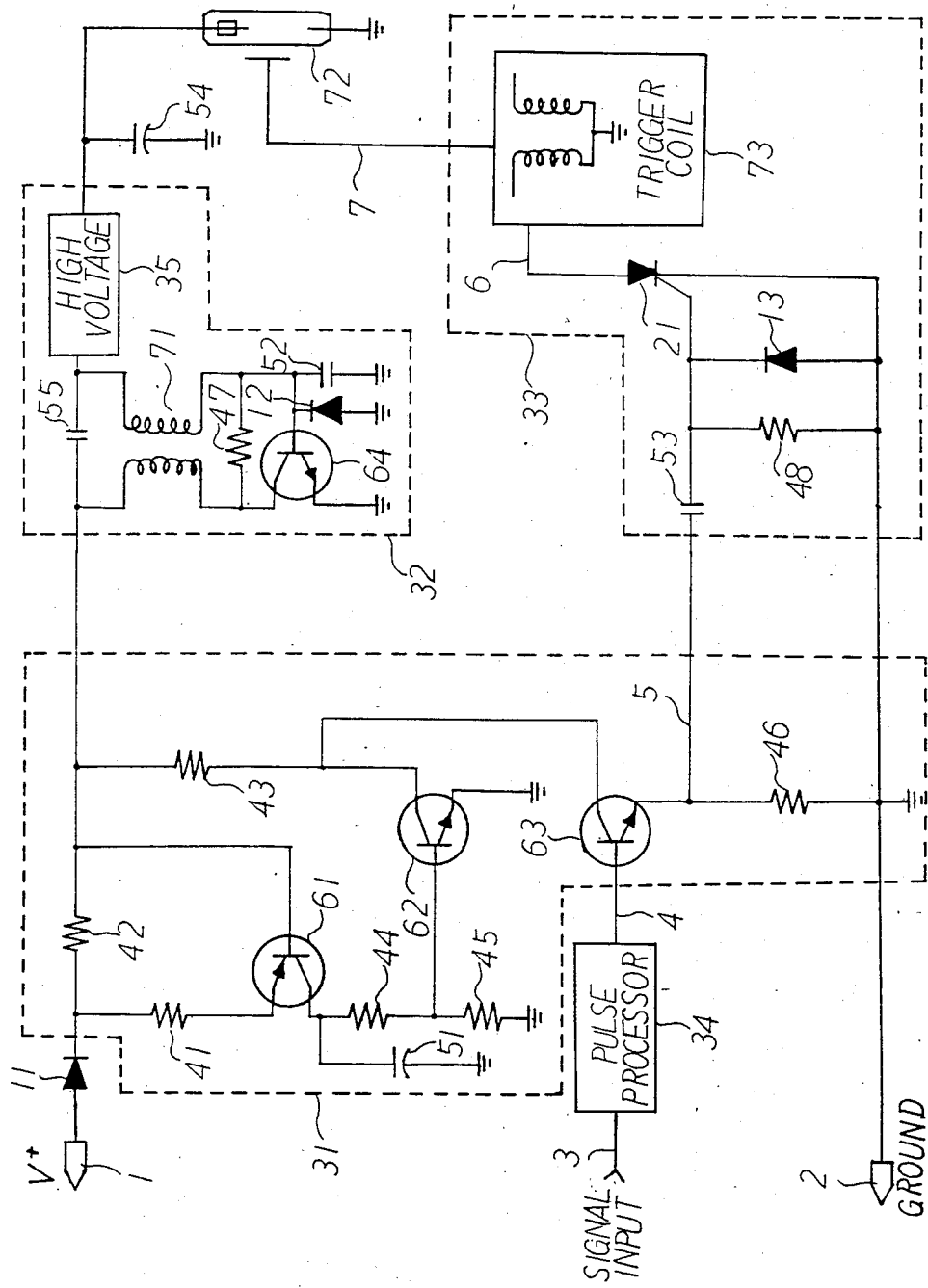
FIG. 1 is a circuit diagram of the protective device for an auto illumination system.

Referring to FIG. 1, the protective device for an auto illumination system is power-supplied by a battery (not shown in the diagram), with the conducting terminal 1 connecting to the positive end of said battery and the conducting terminal 2 to the negative end thereof, to put said protective device in a working condition. The protective device, a protective diode 11 adopted to prevent possible destruction of circuit elements owing to misplaced connection of the terminal ends to said battery, an overcurrent limit circuit 31 consisting of resistors 41, 42, 43, 44, 45 and 46, a capacitor 51 and transistors 61, 62 and 63 which function to generate a curbing signal to block an output signal 4 of the pulse processor 34 from entering into said circuit 31 when a large current appears in said circuit 31 during an illumination process, and a high-voltage oscillator circuit 32 consisting of a resistor 47, capacitors 52, 55, a diode 12, a coil 71 and a transistor 64, which is used to supply the illumination element 72 with its working voltage. A trigger control circuit, made up of a resistor 48, a capacitor 53, a diode 13, and a trigger coil 73 and a silicon controlled rectifier 21, is utilized to produce a negative high voltage in order to actuate the illumination element to work by providing the effect of a differentiator (consisting of a resistor 48 and capacitor 53, for generating a triggering signal which actuates the silicon controlled rectifier 21 to make trigger coil 73 output a negative high voltage. The pulse processor receives output signals from an engine in action, and delivers a positive pulse output for example of width 5 $\mu$s to said circuit 31.

In the following, the operation is further described.

Referring to FIG. 1, when the auto engine starts to run, a signal arrives on the input terminal 3 of said pulse processor 34, and the pulse processor 34 transforms said input signal into a positive pulse of 5 $\mu$s. The transformed signal is output to the input terminal of the overcurrent limit circuit 31 (i.e. the base of transistor 63) via output terminal 4. Accordingly, an output signal appearing on the resistor 46, connected to the emitter of the transistor 63, is coupled to the input terminal of said trigger control circuit 33, wherein it is differentiated by the differentiator (resistor 48 and capacitor 53) for generating a triggering signal to actuate said silicon controlled rectifier 21. This results in a loop formed of conducting line 6, said silicon controlled rectifier 21 and the ground terminal 2, so that a negative 4 kv high voltage pulse is obtained after said loop actuates the conducting line 7 of said trigger coil 73, the pulse being used to ionitiate the operation of each said illumination element 72. In the meantime, the high voltage oscillator circuit 32 is used to charge a capacitor 54 by an output high-voltage, which is then discharged to said illumination element 72 for illumination purposes. During this process of charge and discharge, a large current flows in the resistor 42 of said overcurrent limit circuit 31, so that the transistor 61 is turned on. With a decrease of potential via resistors 44, 45, to transistor 62 is turned on. The collector of the transistor 62 shares a common ground potential. The transistor 63 accordingly is kept in the off state. As a result, the positive pulse signal on the output terminal 4 of the pulse processor 34 is blocked from entering, so that a purpose of restraining the current for the illumination element is achieved. Until the unit of capacitor 51 is sufficiently charged to a design level to cause the transistor 61 of said overcurrent limit circuit 31 to switch the off state, the positive pulse signal on the output terminal 4 of the pulse processor 34 can enter said transistor 63 to cause the triggering of the illumination element by the trigger control circuit to continue. Thus, an effective curbing signal is produced to prevent the excessively rapid discharge of the illumination element during high engine r.p.m.

Summing up, it is apparent that the said protective device according to the present invention provides a simple but practical guard for auto illumination elements to avoid their possible destruction due to excess current.

What I claim is:

1. A protective device in an automotive illumination system including an illumination element, said device having as inputs a voltage source for supplying power and a timing signal of variable frequency, said device comprising an overcurrent limit circuit receiving as inputs said voltage source and said timing signal, and providing a charging current output for supplying power for providing a discharge through said illumination element and a trigger signal output for controlling when said illumination element is discharged, a high-voltage oscillator for receiving said charging current output from said overcurrent limit circuit and for outputting a respective output, a capacitor having one terminal connected to said output from said high-voltage oscillator and to said illumination element, for storing power for said discharging thereof, a trigger control circuit for receiving as an input said trigger signal output from said overcurrent limit circuit and providing a trigger output to cause said illumination element to be discharged as a result of power stored in said capacitor, said overcurrent limit circuit including first means for outputting said circuit trigger signal in correspondence to said timing signal, and second means for generating a curbing signal, said first means including a first transistor having its base connected to receive a signal corresponding to said timing signal, said trigger signal being taken from the emitter of said first transistor, said second means including a first resistor connected between the input of said voltage source and the output of said charging current, second and third resistors connected at respective ends of said first resistor, a second transistor connected at its emitter to a second end of said second resistor and at its base connected to the same end of the first resistor as the third resistor, said second transistor having its collector connected in common to a series circuit of two further resistors and to a capacitor, said capacitor and said series circuit of two further resistors being grounded at their other end, and a third transistor having its base connected between said two further resistors, its collector connected to the second end of said third resistor, and its emitter grounded, wherein the collector of said third transistor is connected in common with the collector of said first said transistor, and wherein said discharge occurs with a frequency equal to that of said timing signal except when said charging current becomes excessive for higher values of said frequency of said timing signal, and said curbing signal acts on said first means to interrupt the correspondence of the trigger signal with said timing signal for said excessive charging current at said higher frequency of said timing signal.

2. the device of claim 1, comprising a protecting diode located between said overcurrent limit circuit and said voltage circuit input, wherein said overcurrent limit circuit comprises a ground terminal for a ground connection, and is protected from a reversal of said voltage source input thereto and the respective ground connection by said protecting diode.

* * * * *